United States Patent
Henderson

[19]

[11] Patent Number: 5,954,901
[45] Date of Patent: Sep. 21, 1999

[54] WINDSHIELD REPAIR APPARATUS AND METHOD

[76] Inventor: Jack Henderson, 6330 Alderfer, Odessa, Tex. 79762

[21] Appl. No.: 08/812,122

[22] Filed: Mar. 5, 1997

[51] Int. Cl.⁶ .................................................. B32B 35/00
[52] U.S. Cl. ........................... 156/94; 264/36; 425/12; 425/13
[58] Field of Search ...................... 156/94; 264/36; 425/11, 12, 13

[56] References Cited

U.S. PATENT DOCUMENTS

| | | | |
|---|---|---|---|
| 4,291,866 | 9/1981 | Petersen | 269/1 |
| 4,814,185 | 3/1989 | Jones | 156/94 |
| 4,820,148 | 4/1989 | Anderson | 156/382 |
| 4,921,411 | 5/1990 | Ottenheimer | 156/94 |
| 4,975,037 | 12/1990 | Freiheit | 156/94 |
| 5,116,441 | 5/1992 | Campfield | 156/94 |
| 5,425,827 | 6/1995 | Campfield | 156/94 |
| 5,565,217 | 10/1996 | Beckert | 264/36 |
| 5,635,116 | 6/1997 | Einiger | 264/36 |
| 5,670,180 | 9/1997 | Mackey | 264/36 |

Primary Examiner—Daniel Stemmer

[57] ABSTRACT

A method and apparatus for repairing dimpled or cracked windshields is set forth. One portion of apparatus utilizes a suction cup, a laterally extending support member, three adjustable legs to level the support member approximately parallel to the windshield, and a threaded housing in inserted therethrough to bear against the windshield. The housing incorporates a plunger which operates as a syringe to inject a fluid resin for repair. On the opposite face, a set of suction cups holds a support member so that the end face of a bolt can be moved against the windshield to slightly bow the back side of the damaged area. The repair procedure includes the optional step of drilling into the dimple or crack, bowing from the back side, injection under pressure wherein the injection step is through an O-ring seal.

17 Claims, 2 Drawing Sheets

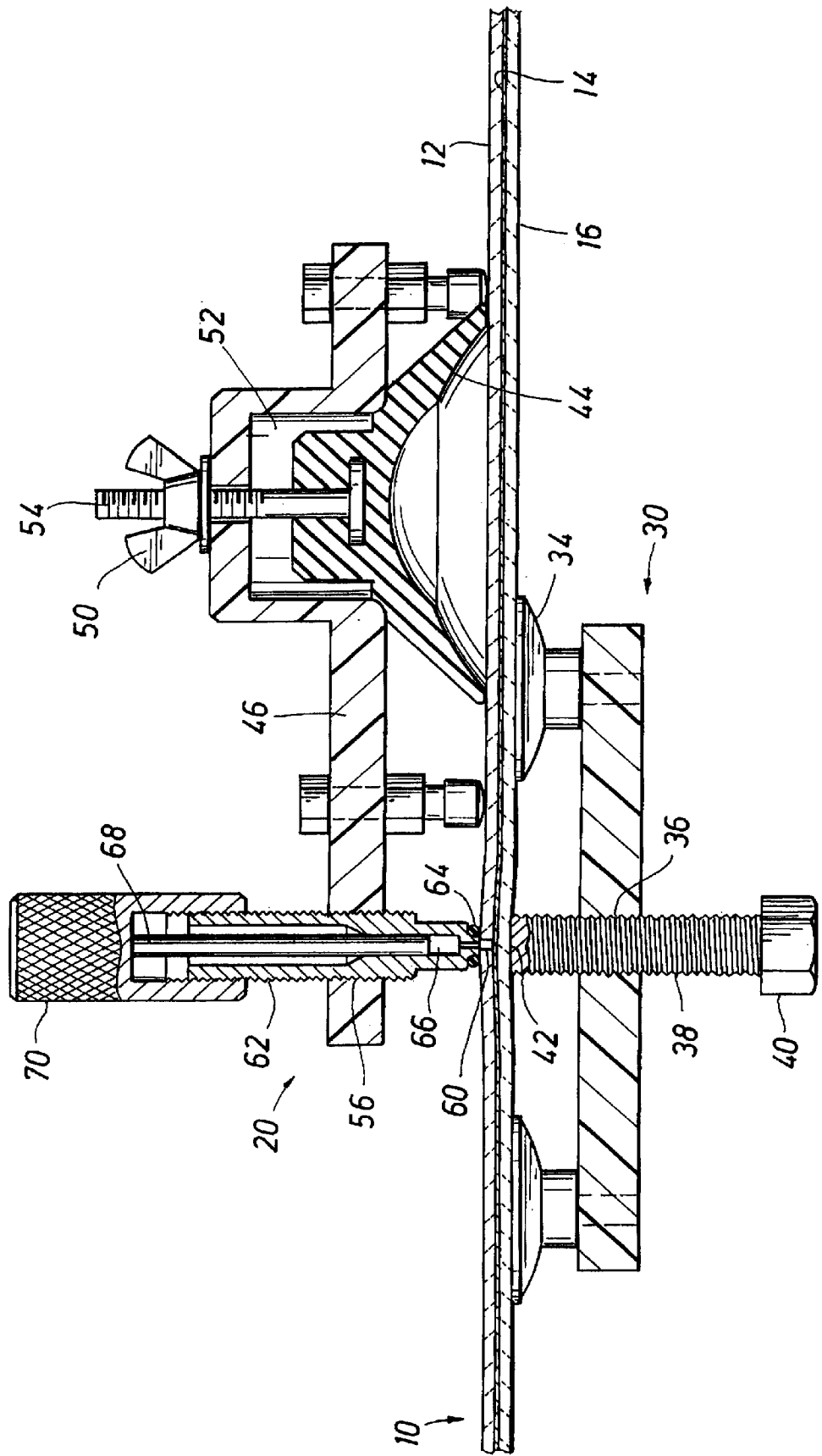

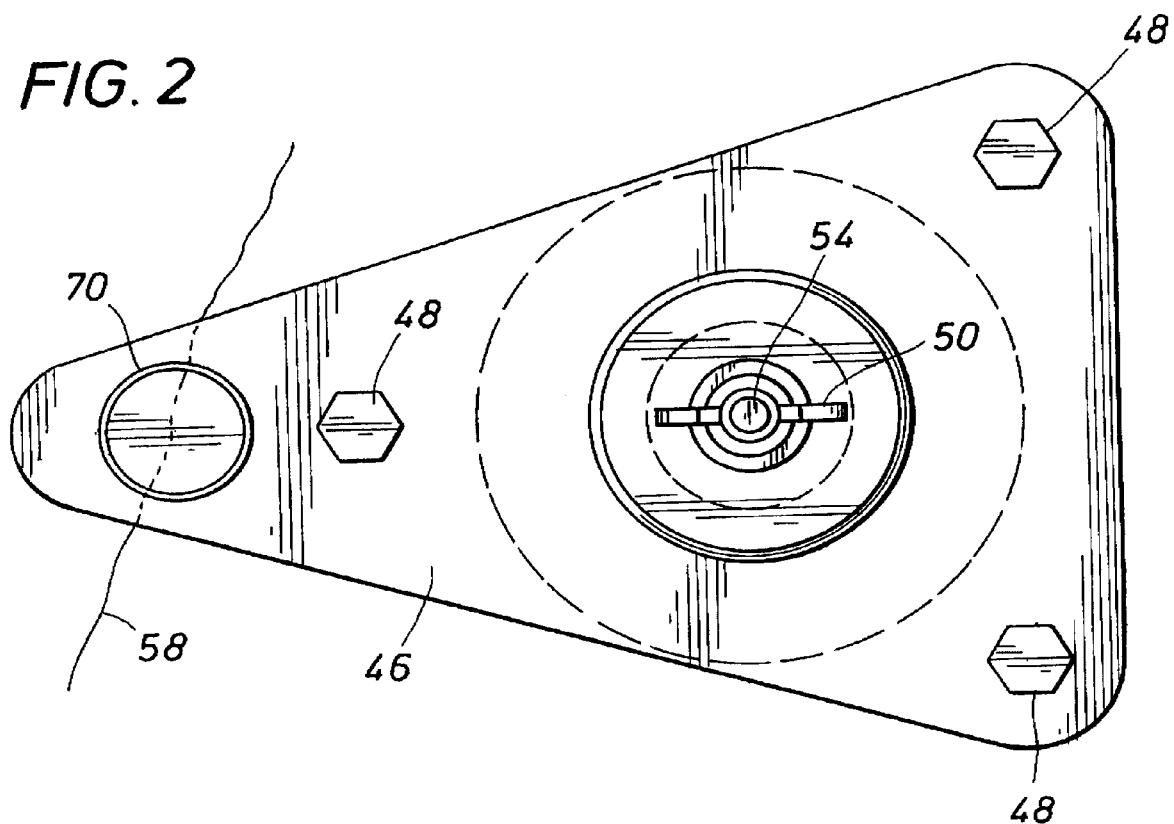
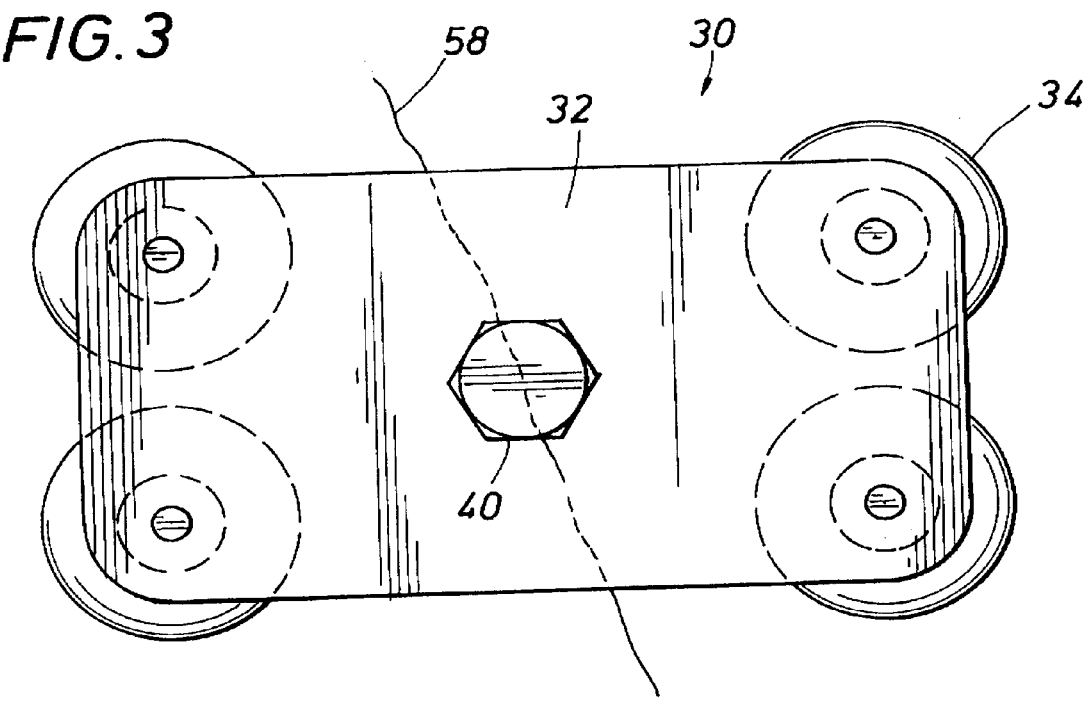

WINDSHIELD REPAIR APPARATUS AND METHOD

BACKGROUND OF THE DISCLOSURE

The present disclosure is directed to a method and an apparatus for repairing windshields. While an automobile windshield is a sheet of glass, it is a composite layer for safety. Simple plate glass is not permitted in automobiles because the glass shards scatter badly upon breaking and risk injury. For a number of years, the glass has been formed of a sandwich or composite layer. It is called safety glass for that reason. Safety glass includes an exposed front layer of glass, a similar back layer of glass, and a center layer of adhesive resilient material. The adhesive layer keeps the pieces from scattering. The adhesive layer is incorporated so that the glass of the two exposed layers will not explosively scatter thereby injuring passengers. Moreover, the adhesive layer holds the windshield together in the event of road hazard damage to the glass.

Road hazard damage occurs typically where a leading vehicle either drops a small pebble or the tires of the vehicle sling such a pebble and a trailing vehicle is struck by it. This forms a typical ding in the glass which is a small crater where a dimple is formed. Safety glass normally responds by confining the dimple to one of the two outer layers. Most commonly, the exposed or front outer layer forms a dimple, i.e., a small crater is chipped in it. The damage does not go all the way through the several layers of the safety glass; rather, it is confined to the front layer. Sometimes, the front layer will not be damaged at all but the damage will be confined to the exposed layer on the interior of the vehicle. That layer may form a similar crater or dimple. The difference arises in that the glass layer on the interior of the vehicle forms a reactive dimple at the location where struck. Either type of damage is equally distracting to the driver.

Most vehicle owners take the attitude that a few dings or dimples in the windshield are simply the common and accepted road hazard for driving a vehicle. They will not spend the money to replace the entire windshield. While that can run several hundred dollars, they sometimes merely neglect the dimple, or they seek a repair of the small dimple. When several dimples accumulate on a windshield, perhaps the owner will then replace the entire windshield, but that often is constrained by the rather expensive cost of the wholesale repair, i.e., replacement of the entire windshield. It is possible for the safety glass in the side and back windows to be damaged, but that is relatively rare because the damage primarily arises when the vehicle is traveling at relatively greater speeds on the open highway. The relative motion of the vehicle provides sufficient differences in velocity of the thrown pebble so that dimpling does occur.

Repairs have been attempted in the past. Tacky resin materials have been applied, somewhat in the fashion of putty, which is smeared in the hole or dimple and surplus is then wiped away. As a generalization, the visually distracting dimple is observed by the driver because there is a sharp change in light transmission through the multiple layers of the safety glass. The dimple area is larger than life because of that change in light transmission. Many of these dimples, however, cannot be easily fixed. It is a matter of random breakage. Sometimes, the break or damage is easily accessed to enable use of a spatula to apply a putty-like resin which thereafter cures to fill the dimple. In another aspect, the dimple surface, after weathering, becomes more difficult to work with. The exposure to weathering on the inside of the dimple changes the texture of the surface. In particular, the adhesive layer becomes hardened and less tacky. This changes the ready acceptance of the adhesive layer to a putty of resin to fill the dimple.

The present disclosure sets forth a method and apparatus for such repairs. More specifically, this equipment and procedure cleans up the interior of a dimple. In particular, if the damage is simply a crack, the present disclosure sets forth a procedure by which the crack can also be repaired. As a first step, pressure is applied on the opposite side which tends to open the crack ever so slightly. A portion is drilled away through the outer layer of glass down to the adhesive layer. This provides better exposed surfaces. The exposure, however, is rather short in duration so that the surfaces do not weather and become more difficult to work with. After applying pressure to the back side and drilling away a portion, a resin is then delivered into the crack, now in the form of a drilled hole, and the crack is filled and leveled to the surface. Because it is applied under some pressure, it more uniformly fills the crack and avoid possible bubbles which might otherwise create visual distractions in the repaired windshield. The present apparatus can be used to repair both cracks and dimples. It can also be used to make repairs on the exposed or front face of the windshield. It, likewise, is effective on the inside face where reverse dimpling sometimes occurs. Repairs at all locations can be made. The disclosed invention is useful to assure that repairs carried out in the windshield result in near perfect optical clarity. The clarity is enhanced by resin packing as noted. Moreover, the resin packing is done in such a fashion or in such a way that the finished product is substantially transparent so that the region or area of the repair to a dimple or crack can often be visually equal to the new windshield clarity.

The equipment of this disclosure should be noted. On the side at which the repair is undertaken, that region is contacted by a suction cup which holds a rigid frame member. The suction cup assures connection. The frame member is held in a parallel position with respect to the windshield. It rests on a tripod of three spaced legs. The tripod is constructed so that it supports a projecting tip over the region of the crack or dimple. It supports and thereby aligns a support member so that drilling is at right angles and is accomplished to the desired depth and location. A threaded container for receiving an epoxy resin is also incorporated. The threaded container includes an axially movable plunger so that it functions as a syringe to inject the necessary resin into the damaged glass area where drilled. If drilling turns out to be unneeded, it injects into the dimple or damaged area. That damaged area is forced outwardly so that the glass is bowed slightly by an apparatus placed on the opposite side. Through the use of multiple suction cups, a support member is attached, and a bolt is mounted and located on the opposite side of the dimple or crack. The bolt is extended, contacts against the glass, and bows the glass ever so slightly at that area. This opens up the dimple or crack somewhat for receiving the uncured resin. On curing, the bolt is removed, thereby restoring the windshield to its initial planar condition so that the grip on the repair material is firm and tight. Mention has been made of the apparatus above and that will be detailed substantially in the description of the preferred embodiment which follows.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

FIG. 1 shows the apparatus of the present invention mounted on the faces of a broken windshield to repair a dimple or crack therein and illustrates both apparatus in sectional view;

FIG. 2 is a plan view of the injecting apparatus of the present disclosure; and

FIG. 3 is a plan view of the bending apparatus of the present disclosure.

DETAILED DESCRIPTION OF THE PREFERRED EMBODIMENT

Attention is now directed to FIG. 1 of the drawings in which the windshield 10 has been damaged and will be repaired using the apparatus of the present disclosure. The externally located apparatus is generally identified by the numeral 20. It is the apparatus used adjacent to the crack or dimple. The apparatus 20 is applied on the outside face of the windshield. The apparatus 30 is applied on the opposite side. Normally, the crack or dimple is on the exterior; where it is on the interior of the vehicle, on the inside exposed face, the equipment 20 and 30 are reversed in position with respect to the interior of the vehicle.

The windshield 10 is shown in sectional view to comprise an external sheet of glass 12, an adhesive layer 14 and an internal glass layer 16. Typically, the layers 12 and 1 6 are made of the same thickness material and have similar optical characteristics. They are both typically glass which, absent the adhesive layer 14, would form dangerous splinters and shards upon breakage. The optical and physical characteristics of the windshield glass, i.e., safety glass, are believed to be well known and specifics relating to them are not categorically required to enhance the present disclosure. Continuing with FIG. 1, the apparatus 30 will be described as a crack widening apparatus. To be sure, the crack is not widened greatly, but modest pressure is applied to the back side. The drawing is exaggerated somewhat to make this point. The apparatus 30 is best shown and described on review of FIG. 3. There, the apparatus 30 comprises a rectangular, rigid, plastic body 32 which is equipped with vacuum cups 34 at the four corners. At the center, it is provided with a threaded passage 36. A threaded bolt 38 is placed in the passage 36. The head 40 on the bolt permits easy tightening with a hand tool. The bolt face 42 bears against the windshield 10 to cause bowing or bulging as shown in the exaggerated form of FIG. 1.

Going back now to FIG. 1 of the drawings, the repair apparatus 20 will be detailed. For convenience, it will be denoted generally as the injector apparatus. It incorporates a relatively large vacuum cup 44. This adheres the equipment to the windshield 10. It is supported with a triangular frame 46. That frame is better shown in FIG. 2 of the drawings. There are three adjustable leveling screws 48 defining tripod support. The leveling screws 48 are engaged either with a screwdriver or wrench to level the plate 46 so that it is substantially parallel to the windshield 10 as illustrated in FIG. 1. Once leveled, the grip can be enhanced by tightening the thumb screw 50 which pulls the suction cup into the chamber 52 by moving the bolt 54 which is anchored in the suction cup. This assures that the equipment is locked in place.

The plate 46 serves as a foundation to support additional equipment. The plate 46 is provided with a tapped opening 56 which is cantilevered at one end. It is located immediately over the damaged area of the windshield. Assume that the windshield has a small crack 58 in it. The crack 58 is located in both FIGS. 2 and 3 to show the relative location of the crack with respect to the equipment mounted for repairing the windshield. As a first step, the opening 56 is aligned with the damaged area (dimple or crack) so that a drill bit can be extended through the opening 56 to drill through the damaged layer 12. It is desirable that drilling extend to the adhesive layer 14. If the damage is old and the adhesive layer has been weathered, it might be desirable to drill at least into the adhesive layer by some distance. This enables the weathered material to be removed so that fresh material is exposed and adhesion on repair is enhanced. In any event, the numeral 60 shows a drilled hole in the outer glass layer 12. The drilled hole optionally is used to assure that the repair can be undertaken in the proper fashion. By that, it may be necessary to drill a hole to enhance the grip and to get more material into the damaged region. On the other hand, if the break is fresh or if the dimple has an appropriate slope on the sides, it may not be necessary to drill. This is an optional step which enhances repair in some instances.

Continuing with the description, but after drilling, the next step is to install the threaded body 62. It is advanced by threading to the point that compression occurs at the O-ring 64. That seals the region of the crack or dimple (with or without the drilled hole 60). The threaded body 62 has an internal chamber 66 which receives and holds a fluid for filling the crack or dimple. It is a resin which cures to provide optical characteristics equal to that of the windshield 10. Moreover, it is adhesive so that it will stick to the sides of the crack or dimple. The threaded body 62 is an elongate tubular body which is axially hollow and which receives a plunger 68. The plunger extends upwardly to a cap 70. The cap 70 is used to advance the plunger 68. The plunger forces the adhesive resin out of the chamber 66 into the crack or dimple. Significance of this pumping procedure will be noted below.

Consider the occasion of repairing a dimple either on the outside or inside of a vehicle. The apparatus 30 is installed on the back side, and the bolt face 42 is located over the region to be repaired and is pressed against that region to create a small bulge. Again, FIG. 1 exaggerates this for sake of explanation. The next step involves attachment of the apparatus 20 by the suction cup 44. It is leveled in that it is located parallel to the windshield 10. As necessary, drilling occurs aligned through the opening 56. Indeed, whether crack or dimple, a small drilled hole is formed as needed. This step is optional and can be omitted depending on aging of the crack or dimple in the windshield, brittleness of the layer 14, and enhancement of the gripping surfaces which are in the crack or dimple. The tubular body 62 is filled with a measured amount of uncured resin. The plunger 68 is positioned in it. The threaded body 62 is threaded until it contacts against the glass and the O-ring 64 compresses somewhat to prevent lateral escape of the resin. Then, resin is pumped simply by tightening the knurled knob 70 for that purpose. Resin is pumped until it begins to fill and almost overfill the drilled area. Thereafter, curing is completed which depends on the amount of solvent and curing agent in the resin, temperature and other factors which are readily understood by one of average skill in this art. When the cure time is adequate, the threaded body 62 is backed off by unthreading, and the equipment can be demounted and moved to another location.

Repair of a simple dimple may require the use of a smaller or larger threaded body 62 and smaller or larger O-ring 64. That is a scale factor which can be accommodated. Such accommodations typically require the use of different size threaded members 62. Repair of a long crack may require repairs at several locations along the crack. Typically, for a long crack, the drilled hole 60 is formed at a specific location. When the uncured resin is pumped into the drilled hole 60, it will flow to the left and right along the crack and fill the crack for some distance. This especially is accomplished when the opposite side of the windshield 10 is bowed by the apparatus 30. When that apparatus is relaxed, the crack is closed, so to speak, and the resin in the crack, having propagated from the drilled hole 60, is clamped in the crack. This enables the single drilled hole 60 to repair portions of the propagated crack to the left and right. Indeed, a long spidery crack, perhaps having two or three legs, might be repaired by placing the drilled hole 30 at the fork of a crack which propagates in several directions. Depending on the viscosity of the resin and other scale factors, flow along the crack may repair a long portion of the crack without requiring many repair steps. So to speak, repair extends laterally while the resin is forced to the left and right in the crack.

The components 20 and 30, in this repair equipment, can be installed for repairs on the exterior or interior of the windshield 10. Most repairs can be completed in the same fashion. Considering the present equipment in repairing a long crack across a windshield, several uses of the equipment may be necessary. Typically, the equipment is installed, used and moved to another location on the windshield in just a few minutes. Of course, the speed of use depends on operator skills.

While the foregoing is directed to the preferred embodiment, the scope thereof is determined by the claims which follow:

I claim:

1. A method of repairing a windshield comprising:
 (a) placing a repair resin in a syringe having an opening therein, and mounting said syringe on a syringe support member;
 (b) positioning the opening of the syringe adjacent to a damaged area in the windshield using a vacuum cup, wherein a vacuum between the windshield and the vacuum cup is formed by placing a lower end of the vacuum cup against the windshield and moving an upper end of said vacuum cup into a chamber in said syringe support member, and wherein the major axis of the syringe is approximately perpendicular to a plane of the windshield in the vicinity of the damage;
 (c) bowing the damaged area by means of a contact face moved against said windshield thereby further opening the damaged area by applying pressure to the damaged area
  from the side of the windshield opposite from the positioned syringe
 (d) injecting the repair resin into the damaged area from the syringe; and
 (e) curing the resin.

2. The method of claim 1 including the additional step of drilling into said damaged area with a drill subsequent to bowing said damaged area and before injecting said resin into said damaged area.

3. The method of claim 2 including the additional step of placing the syringe in position over the damaged area, sealing said syringe opening to said damaged area by advancing said opening against said damaged area and compressing an O-ring, and putting a plunger in said syringe to force repair resin therefrom and through said O-ring and into said damaged area.

4. The method of claim 3 including the step of threading the syringe to advance the syringe thereby compressing said O-ring.

5. A method of repairing a windshield comprising:
 (a) placing a repair resin in a syringe having an opening therein;
 (b) attaching the syringe to a syringe support member;
 (c) attaching the syringe support member to the windshield with a vacuum cup, wherein
  (i) a vacuum is created by placing a lower end of said vacuum cup against the windshield and moving a top end of said vacuum cup into a chamber in said syringe supported by means of a bolt,
  (ii) said syringe support member is positioned over a damaged area of the windshield so that said syringe positioned thereagainst is advanced against the windshield,
  (iii) said syringe support member is approximately parallel to the plane of the windshield, and
  (iv) the opening of the syringe is adjacent to the damaged area in the windshield, with the major axis of the syringe approximately perpendicular to the plane of the windshield in the vicinity of the damaged area;
 (d) bowing the damaged area thereby further opening the damaged area by applying pressure to the damaged area from the side of the windshield opposite from the positioned syringe;
 (e) injecting the repair resin into the damaged area from the singe; and
 (f) curing the resin.

6. The method of claim 5 wherein the step of bowing includes the step of attaching, by vacuum cups, a support member, and incrementally moving a contact face against the windshield.

7. The method of claim 6 wherein said contact face is moved into contact with the windshield by rotating a threaded member to accomplish bowing and unthreading said member to release bowing.

8. The method of claim 7 including the step of attaching said support member by means of four vacuum cups to the windshield.

9. The method of claim 5 wherein said syringe is advanced by threaded engagement toward and away from the windshield to thereby enable the resin therein to be injected into the damaged area.

10. The method of claim 5 including the preinjection step of sealing the damaged area with an O-ring bearing against the surface of the windshield and injecting the resin through the O-ring.

11. The method of claim 10 including the initial step of drilling into the damaged area through the damaged safety glass so that an outer layer thereof is penetrated.

12. The method of claim 10 including the step of positioning the syringe support member in the region adjacent to and above the damaged area by attachment of the vacuum cup and leveling by means of leveling screws said syringe support member with respect to the windshield so that said syringe support member overhangs the damaged area so that the syringe is cantilevered by at least one leveling screw, and the syringe is aligning with the damage area.

13. The method of claim 12 wherein said syringe support member is leveled over the windshield.

14. The method of claim 13 including the step of leveling by adjusting three legs of a tripod.

15. The method of claim 14 wherein said three legs are positioned around said vacuum cup.

16. The method of claim 15 including the step of placing the syringe in position, then filling the syringe and putting a plunger in said syringe to force repair resin therefrom.

17. The method of claim 16 including the step of threading the syringe to advance the syringe into contact with the O-ring bearing, and then compressing the O-ring bearing against the windshield.

* * * * *